April 1, 1958 L. D. BENEDICT 2,828,623
METHOD FOR RAPID TESTING MOISTURE CONTENT
OF AGRICULTURAL PRODUCTS
Filed Dec. 14, 1953
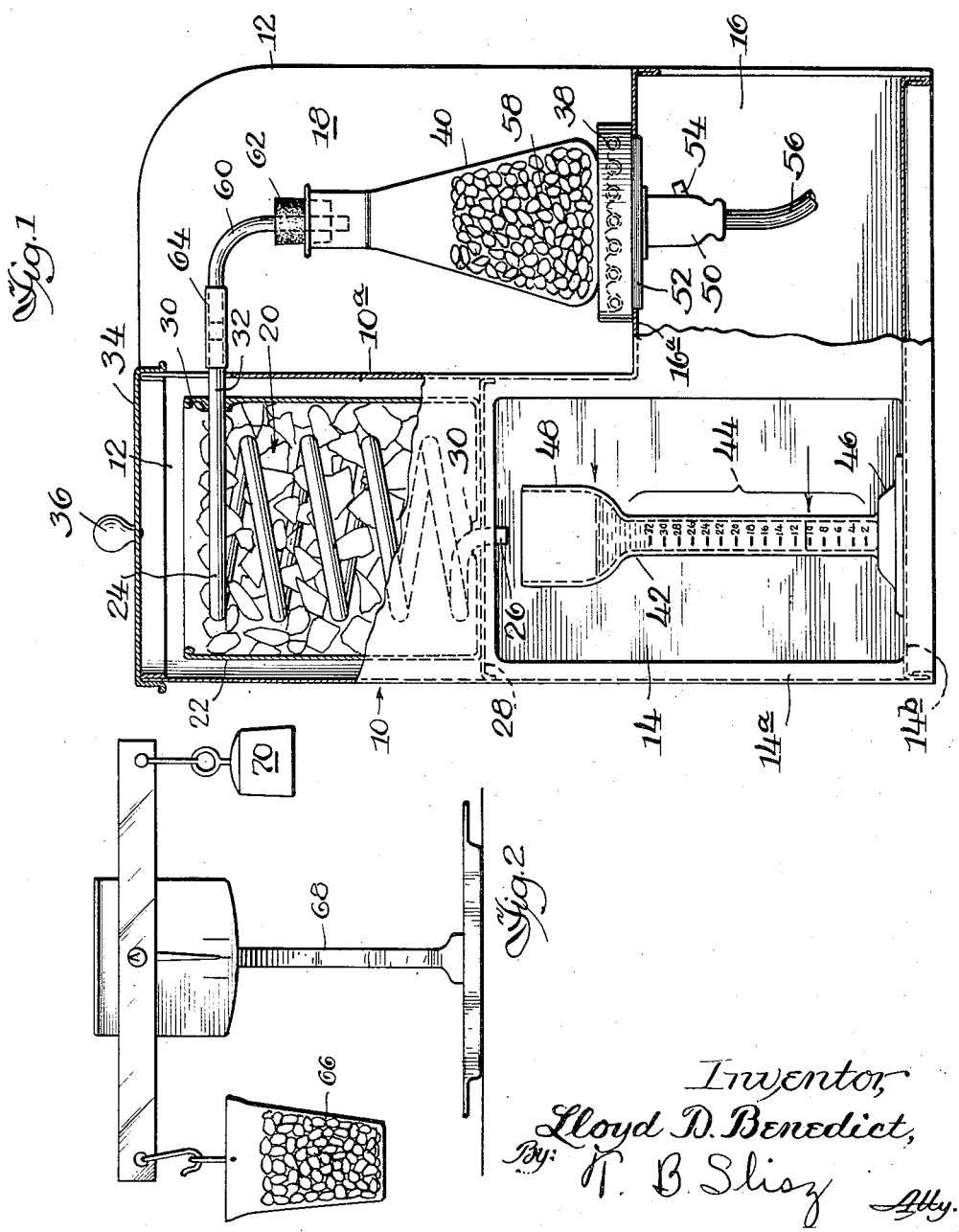
Inventor,
Lloyd D. Benedict,
By: T. B. Slisz
Atty.

United States Patent Office 2,828,623
Patented Apr. 1, 1958

2,828,623

METHOD FOR RAPID TESTING MOISTURE CONTENT OF AGRICULTURAL PRODUCTS

Lloyd D. Benedict, Chicago, Ill.

Application December 14, 1953, Serial No. 397,864

2 Claims. (Cl. 73—76)

This invention pertains to agricultural husbandry. It is directed to those aspects of plant husbandry directed to storage of fodder, grains and foodstuffs in general for human or animal consumption. Specifically it is directed to a practical and quick method for the determination of the moisture content of agricultural forage and food products before they can be stored safely over long periods of time or through winter.

It has been definitely established by agronomists and agricultural scientists that certain forage crops like alfalfa, timothy, etc., certain grains like corn, wheat, rye, millet, etc. can be stored over long periods of time without marked deterioration if properly prepared and conditioned prior to storage. It has been found that in order to protect, conserve and retain palatibility, high vitamin content as well as appearance during storage that all types of agricultural products, especially those primarily used as fodder, and so called grain crops must be dried to the correct moisture content before storage. If the crop is overdried, a considerable amount of vitamins, food value, as well as palatability is lost. The crop becomes quite dusty, easily ignitable and breaks down in particle size so that its "bulk" value as animal food is greatly destroyed. On the other hand if the crop is underdried, then there is a tendency for crop to spoil during storage, for various kinds of molds, saprophytes and various harmful bacillus, like *B. botulimus* may develop and cause various gastric disturbances and even death when eaten by humans or animals. It therefore is very important for every farmer to know the moisture content of his fodder and grain crops before storage not only to provide good and nourishing food but also to prevent spoilage, loss of animals by improperly conditioned foodstuffs in preparation for storage.

A number of moisture testing devices are available for the determination of moisture content of fodder and grain. Many of these are based on principles of electrical conductivity whereby small voltage potentials are transmitted through electrodes inserted into a heap of forage or grain crop. However there are so many variables that even skilled hands have difficulty in ascertaining to a practical degree the moisture content by these devices. Another method generally employed is to take a sample, weigh it, place it in a drying oven maintained at about 220° F.– 230° F. until a uniform weight is reached. The loss in weight is attributed to volatiles assumed to be a loss of moisture in the sample. This latter method is time consuming, will take several hours, require considerable equipment of a refined and delicate nature and in general is not suited to the determination of moisture under field conditions.

It therefore is an object of my invention to provide a simple, facile and convenient method for determination of moisture in various materials.

A further object of my invention is to provide a suitable method for determination of moisture which is practically accurate and foolproof.

A still further object of my invention is to provide a process for determination of moisture of fodder, grains, etc., quickly and accurately before and during storage.

Another object of my invention is to provide a simple means by which the moisture content of organic matter of an agricultural nature can be readily, easily and substantially correctly determined.

These and other objects, variations, extensions, modifications and adaptations will be clearly apparent and quite obvious to one skilled in this art particularly after access is had to the clear, and definitive disclosure hereinbelow of the application of the fundamental concepts underlying my invention to a specific illustration, for example of a grain product whose moisture content it is desired to be determined. It should be definitely understood that this specific application should not be construed directly or indirectly as a limitation of the principles underlying my invention but only as an examplary illustration.

Therefore, in the attached drawings forming a part of this disclosure, for sake of convenience, I have used certain reference characters therein to indicate particular elements of the apparatus used in the determination of moisture by my improved method and which refer to the same elements hereinbelow in the same capacity.

Figure 1 is an elevation of the apparatus sections of which have been partly broken away to show interior portions of the heating unit and condenser chamber.

Figure 2 is an elevation of the scale and appurtenant measures to determine the amount by weight of the sample.

Essentially the apparatus in which the moisture is determined comprises a heating element of a particular heat output, a certain size distilling flask in which a definite quantity by weight of material is inserted, a condensing unit by which the vapors given off are condensed and dropped into a special collector means which is so calibrated that the moisture is read off directly in percentage.

My improved testing device to carry out the test comprises an L-shaped container 10. Suitable walls and dividers are provided to form in said L-shaped container 10 three sections 12, 14 and 16. A protective back wall 18 is also provided to form a walled section to act as a shield for the flask 40 from drafts and breakage. The upper or condensing chamber 12 has therein a removable condensing unit 20 consisting of a jacket 22, a condensing helical tube 24 fitted within the said jacket 22, having an outlet 26 projecting axially through the bottom of said jacket 22, and a supporting plate 28 or floor of the condensing chamber. This floor plate 28 is fastened suitably to the interior surface of the walls of the container 10 at about the midpoint of the tallest part of the L-shaped container 10 and divides it into the condensing section 12 and collecting section 14. The other or upper end of the coiled tube 24 extends laterally at about and through the upper part of the jacket 22 wall and in the same plane through the wall of the said L-shaped container 10 to enter the open section bounded on one side by the upright exterior 10a wall of the upper condensing chamber 12, the protective wall 18 and the roof of the heating chamber 16. Suitable gaskets 30 are provided to prevent the leakage of the coolant about the outlet 26 and inlet 32 of the helical condensing tube 24. A lid 34 with a suitable knob 36 is provided for the condensing chamber 12.

The collecting chamber 14 has preferably an open front portal for insertion of a special graduate or collecting means 42 for the distillate that drops into it from the outlet 26 of the coiled condenser tube 24. The walls 14a framing the portal are preferably made as an integral unit with the walls of the container 10 and reenforce the portal or entry into the receiver chamber 14. The usual floor 14b is provided upon which the graduated receiver 42 rests during the process of testing and distillation.

The graduate 42 comprises the usual tubular glass cylinder 44 resting on the foot 46 and having a flared upper inverted bell-like distillate receiving portion 48. The tubular cylinder 42 has its walls graduated to indicate the percent of moisture present in the material under test that has been distilled during the process of testing.

The heating chamber 16 comprises a closed chamber with a side entry therein for the heating means 38. The heating chamber 16 may be formed integrally as a part of the L-shaped container 10, or as a separate unit and attached thereto or to the back board 18. The ceiling 16a has provided therein an opening through which the heating means may operate or as shown in the preferred embodiment which is illustrated, the heating means 38 rests on the roof or ceiling 16a of the chamber 16. A suitable socket 50 into which the heater 38 is mounted is provided and the base of which simultaneously grips the ceiling 16a between the body of the heater 38 and the socket flange 52. The usual switch 54 and source of current 56 (not illustrated) are provided.

The heating means 38 may be a Bunsen burner, alcohol lamp or preferably an electrical plate in which Nichrome wire of a definite wattage is embedded and can be used to heat the contents 58 within the Erlenmeyer flask 40 resting thereon. The rate of heat input is very important. It has been found as described in detail hereinbelow, that the electrical heating plate of 550 watts has just about the right degree of heat input since it brings to boil the contents 58 within the flask 40 within fifteen to twenty minutes. The flask 40 holds in its neck one end of an angular glass tube 60 by means of a holed stopper 62 and the other end is connected to the condenser inlet 32 by means of a connecting piece 64 of tubing made from preferably of neoprene. A suitable coolant such as cubes of ice are placed in the jacket 22 of the condensing unit 20 to condense any vapors vaporized within the flask 40.

To carry out the process, a sufficient quantity of material to be tested for moisture such as grain, chopped alfalfa, etc. is placed in the weighing cup 66 on one arm of the balance 68 until the counterweight 70 on the other arm is balanced as shown by the pointer of the balance 68. The counterweight 70 not only compensates for the weight of the cup 66 but also for a definite weight of the material to be tested. Normally, about 100 grams of the material to be tested is generally used for test purposes. After the material is weighed it is placed in the distillation flask 40 and covered with a suitable distillation liquid of a water non-miscible type such as kerosene, xylene, naphthas and similar hydrocarbons generally having a boiling range from above that of water to about 520° F. By selecting an agent of this type, it takes a certain amount of heat of vaporization, which will act on the material in the flask 40, permeate it to release any free moisture contained therein and to carry it over since it boils above the boiling temperature of water but below the decomposition range of the material. Thus I avoid pyrolysis of the material with formation of water, acetone, alcohols, furfurals, etc. By boiling the material to be tested in a water non-miscible liquid at a temperature below its decomposition, I avoid the introduction of extraneous water and materials formed during the pyrolysis of the material tested, which would give a misleading water content and an inaccurate test of the free water present in the tested material.

For illustrative purposes hydrocarbons, liquids such as obtained from the petroleum industry are used because of their low cost and general availability. However, many organic liquids either aliphatic or aromatic which are not miscible with water and which have a boiling point above water but below the decomposition point of the material under test can be used quite satisfactorily. Preferably I employ a non-miscible with water reagent having a density lighter than water so that by having the graduated cylinder reading from bottom up to the top, the amount of cubic centimeters of water to the separation line will immediately indicate in percent the water content of the material tested.

After the flask is filled with the grain, etc., the material 58 is covered with the liquid generally about 150 cc. is sufficient. The tube 60 with the stopper 62 is attached to connecting flexible tubing 64 on the inlet 32 of coil 34 and the stopper 62 inserted into the neck of the flask. The condenser unit 20 is filled with ice and water to a level sufficient to cover the condensing coil 24. The lid 34 is placed over the condenser chamber 12 to protect the contents and as an insulation since it, as well as the walls of the L-shaped container 10 may be insulated.

When everything is in place and properly secured the electric heater having a 550 watt output is turned on to heat the contents of the flask. A petroleum distillate fraction having an initial boiling point of about 340° F. is used as the distillation liquid. It will be slowly heated by the 550 watt heater and within 15–20 minutes approximately 120–130 cc. will boil over, condense and collect in the graduated cylinder 44. Since this initial boiling temperature is sufficiently high to vaporize all of the free water, the water will condense in the lower part of the graduate. After the graduate is filled with the distillate the heater is shut off, the equipment permitted to cool and any adhering liquid within the coiled tube 24 is blown out by means of air or a slight puff of breath. The liquid petroleum fraction being non-miscible is lighter and floats on the water. The water can be read directly since it separates out in the bottom of the graduate. In case a 100 gram sample is used and the graduated cylinder has a 100 cc. volume, each 1 cc. graduation on the cylinder will represent one percent of water. The total amount of water in the graduate is the total amount of free water present in the material tested.

In order to obtain still greater accuracy, I may before using the non-miscible liquid saturate the same with water, and then use the clear, supernatant water saturated liquid as the reagent for removing water in the distillation test. Thus the final distillate is saturated with water and does not absorb any from the material tested.

Certain materials like aliphatic compounds such as gasoline, or kerosene and similar petroleum products, which are not miscible with water and within the boiling range of water will have a tendency to dissolve small quantities of water under room conditions. For instance the International Critical Tables, 1928 edition, volume 3, page 392 shows the amounts of water dissolved in gasoline and in kerosene under various temperature conditions some of which would normally be considered as room temperatures. These are listed below

| Gasoline (Boiling point, 40–145 C.) | | Kerosene (Boiling point, 190–250 C.) | |
|---|---|---|---|
| Percent water dissolved in 100 ml. | Temperature, Degrees Centigrade | Percent water dissolved in 100 ml. | Temperature, Degrees Centigrade |
| 0.0098 | 25 | 0.0012 | −2 |
| 0.0141 | 35 | 0.005 | 18 |
| 0.0160 | 37.5 | 0.007 | 23 |
|  |  | 0.008 | 30 |
|  |  | 0.012 | 36 |
|  |  | 0.026 | 53 |

The liquid selected for use in the test, for instance, like gasoline, is thoroughly shaken with water under temperature conditions of the environment of the test which are sometimes described as room conditions, allowed to stand until all of the water in excess settles out, and the clear water-saturated supernatant liquid is decanted in the proper amount for use in the test. Thus the small amount of water present initially in the liquid even when distilled over will also be present in the distillate and the amount of water which separates out in the graduated tube is automatically and continuously compensated and corrected under the temperature conditions of the test. Thus the water is accurately determined as present in the agricultural products by means of this test.

My improved method of making the test is very readily accomplished and is sufficiently accurate to determine practically the amount of free moisture present in the grain, forage crops, silage, etc. I am therefore able to determine in advance the keeping quality of the product by knowing its moisture content. If the moisture content is high, I can by means of either natural or artificial drying methods reduce the moisture content to the desired degree to obtain proper storage conditions.

It is essential that all factors, namely heat input or time in which the distillation takes place, the non-miscible and boiling point characteristics of the volatile agent, its ability to carry over in vapor phase the moisture present in the material without breakdown under test conditions so as to obtain by proper balance the complete removal of moisture within the distillation time and without any manual or other temperature mechanical control except as shown in this disclosure. Thus I not only avoid complex mechanical temperature controls, remove the human factor of negligence and failure to follow operational techniques, dispense with use of easily breakable thermometers and still obtain remarkably accurate and practical results, at relatively low cost, easily operatable equipment and within a short time under fixed field conditions. It is the answer to a harried farmer working under pressure during the extremely busy harvest time who is trying to store his harvest forage crops under proper conditions and freedom from spoilage.

Though the principles of my invention have been specifically applied as described hereinabove and in the attached drawings, it is not intended to be limited to the same for obviously the principles can be used in other respects and still come within the scope and spirit of the hereunto appended claims defining my invention.

I claim:

1. The process of determining the moisture content of agricultural products such as grains and forage foodstuffs comprising the steps of selecting a uniform sample of a predetermined weight, placing the said sample in a distillation unit, adding a sufficient quantity of a water saturated, non-miscible type organic liquid having a specific gravity less than water and having a boiling point above that of water to cover said sample, heating said organic liquid containing the sample at a uniform rate until approximately a preselected amount of said organic liquid is distilled and condensed in a period of time not less than fifteen minutes and not more than thirty minutes, allowing the condensed liquids to separate in a graduated collecting means, and determining the amount of water content present by direct reading of the separated lower aqueous layer.

2. In the process of claim 1, wherein the non-miscible organic liquid is saturated with water under the temperature conditions under which the materials are to be tested and decanting the said water saturated organic liquid prior to its use in the process of claim 1.

References Cited in the file of this patent

UNITED STATES PATENTS

| | | |
|---|---|---|
| 848,616 | Brown et al. | Mar. 26, 1907 |
| 1,415,546 | Greenwood | May 9, 1922 |

FOREIGN PATENTS

| | | |
|---|---|---|
| 238,863 | Switzerland | Aug. 31, 1945 |